UNITED STATES PATENT OFFICE.

GEORGE JONES ATKINS, OF LONDON, ENGLAND.

MANUFACTURE OF MINERAL COLORS FOR CERAMIC PHOTOGRAPHY.

SPECIFICATION forming part of Letters Patent No. 572,095, dated December 1, 1896.

Application filed April 30, 1896. Serial No. 589,744. (No specimens.) Patented in England February 15, 1895, No. 3,356; in France August 1, 1895, No. 249,348; in Belgium August 2, 1895, No. 116,805; in Austria December 6, 1895, No. 45/4,667, and in Germany January 17, 1896, No. 52,271.

*To all whom it may concern:*

Be it known that I, GEORGE JONES ATKINS, a subject of the Queen of Great Britain, residing at 35 East Bank, Stamford Hill, London, in the county of Middlesex, England, have invented certain Improvements in the Manufacture of Mineral and Enamel Colors for Use in the Production of Ceramic and other Photographs, (for which I have obtained Letters Patent in Great Britain, dated February 15, 1895, No. 3,356; in France, dated August 1, 1895, No. 249,348; in Germany, dated January 17, 1896, No. 52,271; in Belgium, dated August 2, 1895, No. 116,805, and in Austria, dated December 6, 1895, No. 45/4,667,) of which the following is a specification.

It is known that attempts have been made to substitute mineral and enamel colors for the carbon and other pigments used in the ordinary carbon process of photography, but hitherto, so far as I am aware, without success.

The carbon process is based upon the use of a mixture of gelatin or other analogous colloid used as vehicle and carbon, such as india-ink, for example, or other pigment. This mixture is spread upon paper and forms what is called "carbon tissue," which is made sensitive to light by means of a solution of ammonium, sodium, or potassium bichromate, and when dry is placed under a suitable photographic negative and exposed to the action of light. This brings about a chemical action by which the gelatin is rendered more or less insoluble where the light has passed through the negative. The tissue, after suitable exposure, is transferred and subjected to the well-known process of development, that is to say, the gelatin that has not been rendered insoluble by the action of light is washed out with hot water.

When ceramic or vitrifiable pigments are substituted for carbon, it is found that on sensitizing the tissue and drying it a similar chemical action to that produced by light has already been brought about, which renders the tissue or compound unfit for photographic purposes.

Of the metallic compounds constituting these pigments those which are most acted upon in this way are iron, manganese, copper, lead, and cobalt oxids, and these are the principal ingredients employed in producing the various dark-colored pigments used for vitrifiable colors and are of the greatest commercial value.

The object of the present invention is to obviate the above-described premature action of the mineral pigments upon the mixture of gelatin and sensitizing-salt. For this purpose I treat the mineral or enamel color preferably with solutions of soluble chromates in such manner as to bring about saturation of the constituents of the enamel mixture with chromium trioxid, ($CrO_3$,) thus preventing the reaction above described when the compound is brought into contact with the gelatin or other colloid substance in admixture with the sensitizing-salt. This combination and consequent change may be effected in a variety of ways. For example, according to one method I grind the mineral or enamel color to a powder and then treat it with a solution of chromic acid or ammonium, potassium, or sodium bichromate of a sufficient strength to saturate the metals or minerals in the color under treatment. This saturation of the metals or minerals with chromium trioxid can always be secured by having a slight excess of the chromate, which excess is indicated by a yellow tint imparted to the solution. The resulting compound is then dried or not, according to circumstances, and may be mixed with the gelatin or other colloid and made into tissue or film without fear of any premature action taking place when it is afterward treated with the sensitizing agent.

In the case of the enamel colors the preliminary combination of the chromate with the metallic oxid may be effected in the crucible in which the fluxes and minerals are fused together; but the colors are generally somewhat changed by this method of treatment.

The chromate may also be combined with the mineral or enamel color in the grinding operation.

I prefer the humid method of treatment first described above, as the excess of chromate can be readily washed out, and the color can be used in the wet state or dried and kept for subsequent use.

I claim—

1. The herein-described method of rendering mineral and enamel colors suitable for photography by treating them with chromic acid or chromates sufficient to saturate their metallic components before mixing them with the gelatin or other colloid substance for forming the sensitive films.

2. As a new article of manufacture for use in photography, mineral or enamel colors the metallic components of which are saturated with chromic acid or chromates before they are mixed with the gelatin or other colloid substance for forming the sensitive films.

In witness whereof I have hereunto set my hand in presence of two witnesses.

GEORGE JONES ATKINS.

Witnesses:
WILLIAM HENRY BECK,
STEPHEN EDWARD GUNYON.